(12) United States Patent
Chi et al.

(10) Patent No.: US 8,108,379 B2
(45) Date of Patent: Jan. 31, 2012

(54) SYSTEM AND METHOD FOR EDITING HISTORY IN A SEARCH RESULTS PAGE

(75) Inventors: Liang-Yu Chi, San Francisco, CA (US); Ashley Hall, Menlo Park, CA (US); Swati Raju, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 302 days.

(21) Appl. No.: 11/863,397

(22) Filed: Sep. 28, 2007

(65) Prior Publication Data
US 2009/0089267 A1    Apr. 2, 2009

(51) Int. Cl.
G06F 17/30    (2006.01)
(52) U.S. Cl. ...................................... 707/708
(58) Field of Classification Search .................. None
See application file for complete search history.

(56) References Cited

U.S. PATENT DOCUMENTS

| 6,944,612 | B2* | 9/2005 | Roustant et al. ................ 1/1 |
| 2002/0091836 | A1* | 7/2002 | Moetteli ........................ 709/227 |
| 2005/0120003 | A1* | 6/2005 | Drury et al. ..................... 707/3 |
| 2005/0144158 | A1* | 6/2005 | Capper et al. ................... 707/3 |
| 2006/0004850 | A1* | 1/2006 | Chowdhury ............... 707/103 R |
| 2007/0067305 | A1* | 3/2007 | Ives ............................ 707/10 |
| 2008/0243786 | A1* | 10/2008 | Stading ......................... 707/3 |

* cited by examiner

*Primary Examiner* — Neveen Abel Jalil
*Assistant Examiner* — Kevin Young
(74) *Attorney, Agent, or Firm* — Ostrow Kaufman LLP

(57) ABSTRACT

The present invention is directed towards systems, methods and computer program products for controlling a user history module. According to one embodiment, a method for controlling a user history module comprises providing a history module to a user, the history module comprising a plurality of search queries and a plurality of selected search results, and monitoring user interaction with the user search history panel. A predetermined operation is performed on the history module in response to a user interaction.

18 Claims, 9 Drawing Sheets

SYSTEM AND METHOD FOR EDITING HISTORY IN A SEARCH RESULTS PAGE

CROSS REFERENCE TO RELATED APPLICATIONS

This application is related to the following pending applications, which are hereby incorporated herein by reference in their entirety:

U.S. patent application Ser. No. 11/863,383, entitled "SYSTEM AND METHOD FOR INCLUSION OF HISTORY IN A SEARCH RESULTS PAGE," filed Sep. 28, 2007; and U.S. patent application Ser. No. 11/863,416, entitled "SYSTEM AND METHOD FOR HISTORY CLUSTERING," filed Sep. 28, 2007.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to maintaining a history of user interaction with content items available on a network. More specifically, the present invention is directed towards systems and methods for storing, displaying and modifying a lightweight record of user browsing history on a search results page.

BACKGROUND OF THE INVENTION

As the amount of data stored on networks, both local and global, increases, the ease of accessing relevant data becomes a non-trivial question. Evidence of this trend is illustrated in the rise of Internet search engines as a major sector of the Internet economy. A plethora of solutions have been developed to attempt to index the amount of data on large networks such as the Internet. These solutions allow users to search for data across the Internet from a single point of access and, through sophisticated indexing mechanisms, attempt to return or otherwise identify the most relevant data possible for a given user query.

Although indexing increases the chances of aiding a user in locating relevant results from a large number of content items, it does not fully exploit or incorporate the browsing behavior of a user. That is, the general functionality of a search engine is not concerned with what a user has previously looked at, only what they are currently looking at. One method of solving this problem is the use of bookmarks, implemented by many popular web browsing software and several web-based bookmark applications. Bookmarks allow a user to store a reference to a content item of interest on their device or the web with the purpose of easily returning to the desired content item. The use of a bookmark is a simplistic solution that contains many inherent problems. First, bookmarks are maintained by the individual, thus their organization (or lack thereof) is dictated by the individual, usually resulting in an unorganized set of bookmarks. Second, bookmarks require active participation from the user. That is, a user must manually select to bookmark a web page in order to retain its location. Third, bookmarks are local objects and are thus unavailable to a user operating on a device other than the device containing his or her bookmarks.

Another prior art solution is to maintain a chronology of a user's searching behavior. In this approach, a search engine maintains a chronological listing of content items for which a user has searches and the results that user selects in response to a given search query. This approach provides a history of user interaction, but severely limits the usability of the stored data. A user must know approximately when a search term was entered and is usually only given titles of visited content items, thus requiring the user to remember the contents of the content item.

Thus there is a need in the art for systems, methods and computer program products for providing users with intelligent history data on the basis of search engine interaction. Embodiments of the present invention display the results of a user history session on a search page and allows for the clustering of history data, e.g., by time or by search query keyword analysis, thereby allowing a user to more efficiently evaluate and locate past history results.

SUMMARY OF THE INVENTION

The present invention is directed towards systems, methods and computer program products for maintaining a record of a user search history. A method for maintaining a record of a user search history according to one embodiment comprises receiving and storing a plurality of user search queries, providing a plurality of search results related to the user search queries and monitoring user interaction with the plurality of search results. Interactions with at least one of the search results are stored and a history module is displayed that comprises the user search queries and the user interactions. Storing the user search query and storing the interactions may comprise storing the user search query the said interactions in a cookie, for example, storing the cookie as a session cookie.

According to one embodiment, displaying a history module comprises displaying a graphical element within a browser to display the user search queries and the user interactions. Displaying the graphical element may comprise executing one or more of HTML, ActiveX and JavaScript components. Displaying the history module may also comprise displaying the panel in conjunction with a search results page. Furthermore, the present embodiment may filter the user search queries and the user interactions on the basis of one or more predetermined criteria.

A system for maintaining a record of a user search history according to one embodiment comprises a content server coupled to a network and a plurality of client devices coupled to the network, a given client device operative to submit search queries to the content server and receive a plurality of search results from the content server. The client devices are operative to store a plurality of user search queries, monitor user interactions with the plurality of search results, store one or more interactions with at least one of the search results and display a history module that indicates the user search queries and the user interactions. A given client device may store the user plurality of user search queries and the interactions in a cookie, e.g., a session cookie.

According to one embodiment, the client device displays the history module as a graphical element within a browser. The graphical element may comprise one or more of HTML, ActiveX and JavaScript components. The client device may also display the history module in conjunction with a search results page. Furthermore, the client device may filter the user search queries and the user interactions on the basis of one or more predetermined criteria.

Embodiments of the invention are also directed towards systems, methods and computer program products for controlling a user history module. A method for controlling a user history module according to one embodiment comprises providing a history module to a user, the history module comprising a plurality of search queries and a plurality of selected search results and monitoring user interaction with the user search history panel. A predetermined operation is performed on the history module in response to a user interaction.

Performing the predetermined operation according to one embodiment comprises clearing the user search history panel. Alternatively, or in conjunction with the foregoing, performing the predetermined operation may comprise bookmarking, sharing or marking the search queries or said selected search results. Monitoring the user interaction may comprise monitoring the input of text via an input device. Accordingly, performing the predetermined operation may comprise filtering the search queries and the search results on the basis of the input received from the input device. Filtering may limit the search queries and the search results that the history module displays.

A system for controlling a user search history panel according to one embodiment comprises a content server coupled to a network and a plurality of client devices coupled to the network, a given client device operative to submit search queries to the content server and to receive a plurality of search results from the content server. The client devices are operative to provide a history module to a user, the history module comprising a plurality of search queries and a plurality of selected search results, and monitor user interaction with the user search history panel. The client devices may also perform a predetermined operation on the history module in response to a user interaction.

According to one embodiment, the predetermined operation comprises clearing said user search history panel. Alternatively, or in conjunction with the foregoing, the predetermined operation comprises bookmarking, sharing or marking said search queries or said selected search results. The user interaction may comprise the input of text via an input device and may comprise the basis for filtering the search queries and the search results.

In addition to the foregoing, embodiments of the invention are directed towards systems, method and computer program code for clustering a plurality of user history items. A method of clustering a plurality of user history items according to one embodiment comprises storing a plurality of history items corresponding to a plurality of user search queries and a plurality of user selected items. The history items are clustered according to a time-based clustering algorithm, as well as clustered according to a subject matter based clustering algorithm. The clustered history items are displayed to the user.

According to one embodiment, clustering the history items according to a time-based clustering algorithm comprises clustering the history items within a predetermined time range. Clustering the history items according to a subject matter based clustering algorithm may comprise clustering the history items based on extracted subject matter of the history items. Furthermore, either (or both) the time-based clustering algorithm or the subject matter based clustering algorithm may be disabled by a user. Displaying the clustered history items may comprise enabling a user to modify the display of the clustered history items on the basis of one or more predetermined criteria.

A system for clustering a plurality of user history items according to one embodiment comprises a content server coupled to a network and a plurality of client devices coupled to the network, a given client device operative to submit search queries to the content server and to receive a plurality of search results from the content server. The client device is operative to store a plurality of history items corresponding to a plurality of user search queries and a plurality of user selected items, as well as cluster the history items according to a time-based clustering algorithm and a subject matter based clustering algorithm. Finally, the client device is operative to display the clustered history items.

According to one embodiment, the time-based clustering algorithm clusters the history items within a predetermined time range. The subject matter based clustering algorithm may cluster the history items on the basis of extracted subject matter of the history items. Either (or both) the time-based clustering algorithm or the subject matter based clustering algorithm may be disabled by a user. Furthermore, the client device may be operative to enable a user to modify the display of the clustered history items on the basis of one or more predetermined criteria.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
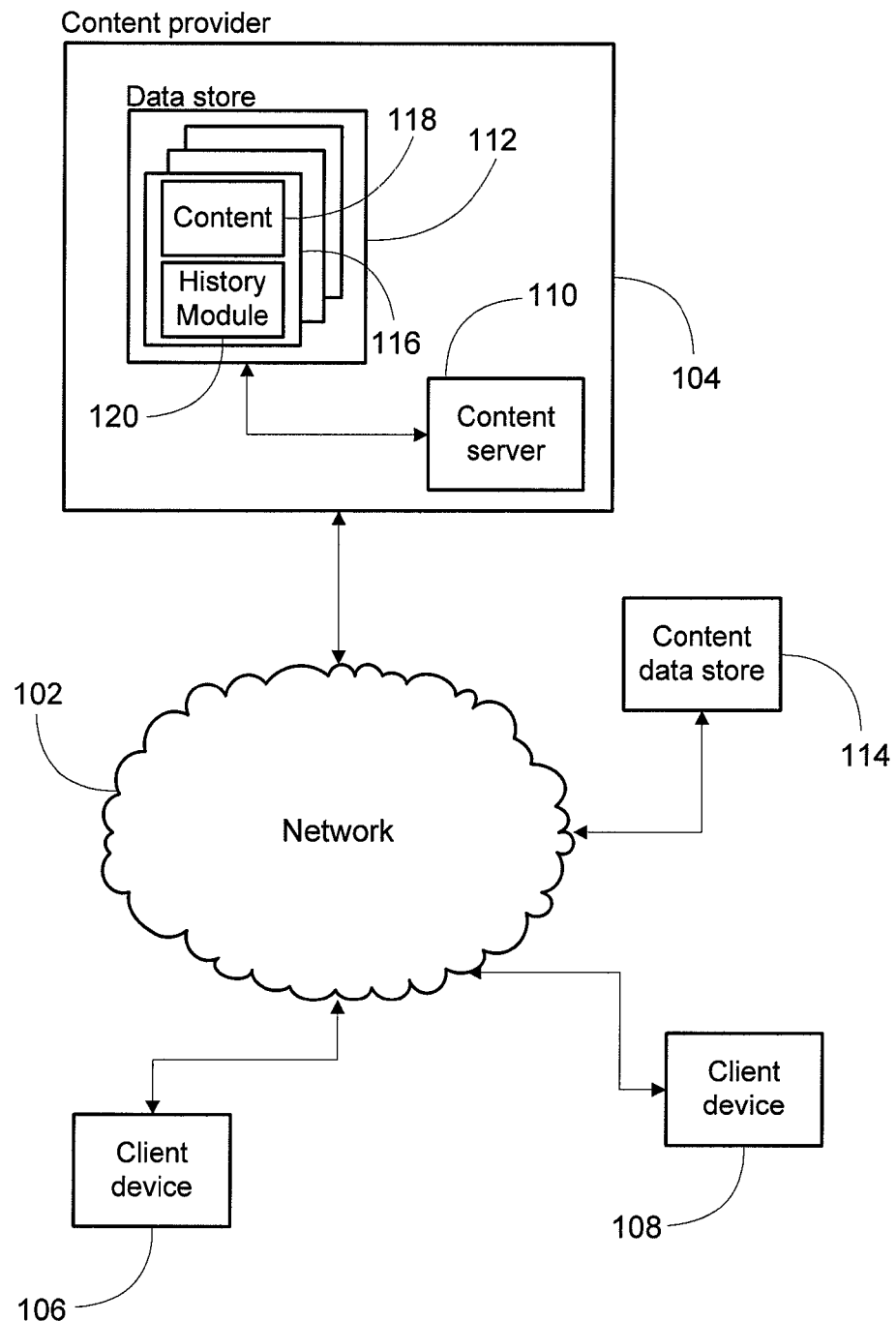
FIG. 1 presents a block diagram illustrating a system for providing history content within a search result page according to one embodiment of the present invention.

FIG. 1 presents a block diagram illustrating a system for providing history content within a search result page according to one embodiment of the present invention. According to the embodiment that FIG. 1 illustrates, one or more client devices 106 and 108 are communicatively coupled to a network 102, which may include a connection to one or more local and wide area networks, such as the Internet. According to one embodiment of the invention, a given client device 106 and 108 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 106 and 108 may be in communication with a content provider 104 that hosts one or more content items 116. The content provider 104 may maintain one or more content servers 110, a given content server 110 hosting one or more web pages. The content provider 104 may also comprise a repository for the storage and transmission of one or more content items 112 in response to a request from a client device 106 and 108. For example, the content provider 104 may comprise a web site that includes a content server 110 (e.g., Apache™, Internet Information Server™, etc.) and a data store 112, which according to one embodiment is a database that maintains web pages in an organized and structured manner. The content provider 104 may further maintain program code (not pictured) that, when executed by the content provider 104, is operative to dynamically generate one or more content items.

A given client device 106 and 108 in communication with the content provider 104 requests a content item 116 that a content server 110 maintains at the content provider 104. The content server 110 may maintain dynamic information at the content provider 104 for delivery to a client device 106 and 108. For example, where the content server 110 is using the content provider 104 to host one or more web pages, the content provider 104 may provide the HTML or page markup to a given client 106 and 108, which the content provider 104 may generate dynamically on the basis of program or scripting code that the content server 110 maintains at the content provider 104, e.g., Active Sever Page or Java Server Page code.

A resultant page that the content provider 104 provides to a client 106 and 108 may have links or references to one or more items of static resources for inclusion in the page and rendering by the client 106 and 108. Exemplary resources that a content item may comprise include, but are not limited to, JavaScript files, Cascading Style Sheets, images, video and audio. The network 102 is operative to deliver these resources, which links or references in a given content item instruct the client 106 and 108 to retrieve from the content delivery network 102.

As FIG. 1 further illustrates, a content item 116 may comprise a plurality of elements, including a content module 118 and a history module 120. In accordance with one embodiment, a content module 118 may be operative to retrieve search results from a search engine and display the returned search results within content module 118. History module 120 may comprise program code, such as HTML or JavaScript, which may be operative to intercept user interactions and generate history information related to a user interaction with content item 116, e.g., user interaction with a search results page.

In one embodiment, a content item 116 may comprise a plurality of HTML FRAME elements to encapsulate the history module 120 and content module 118. In this embodiment, the history module 120 and the content module 118 may be separate HTML files stored within data store 112. Alternatively, history module 120 and content module 118 may be modules present within a single content item 116. For example, history module 120 and content module 118 may comprise an HTML DIV element with a plurality of subcomponents. In this embodiment, content item 116 may utilize a plurality of asynchronous data requests to dynamically update the search results present within content module 118 and the history data gathered by history module 120.

Figure 2:
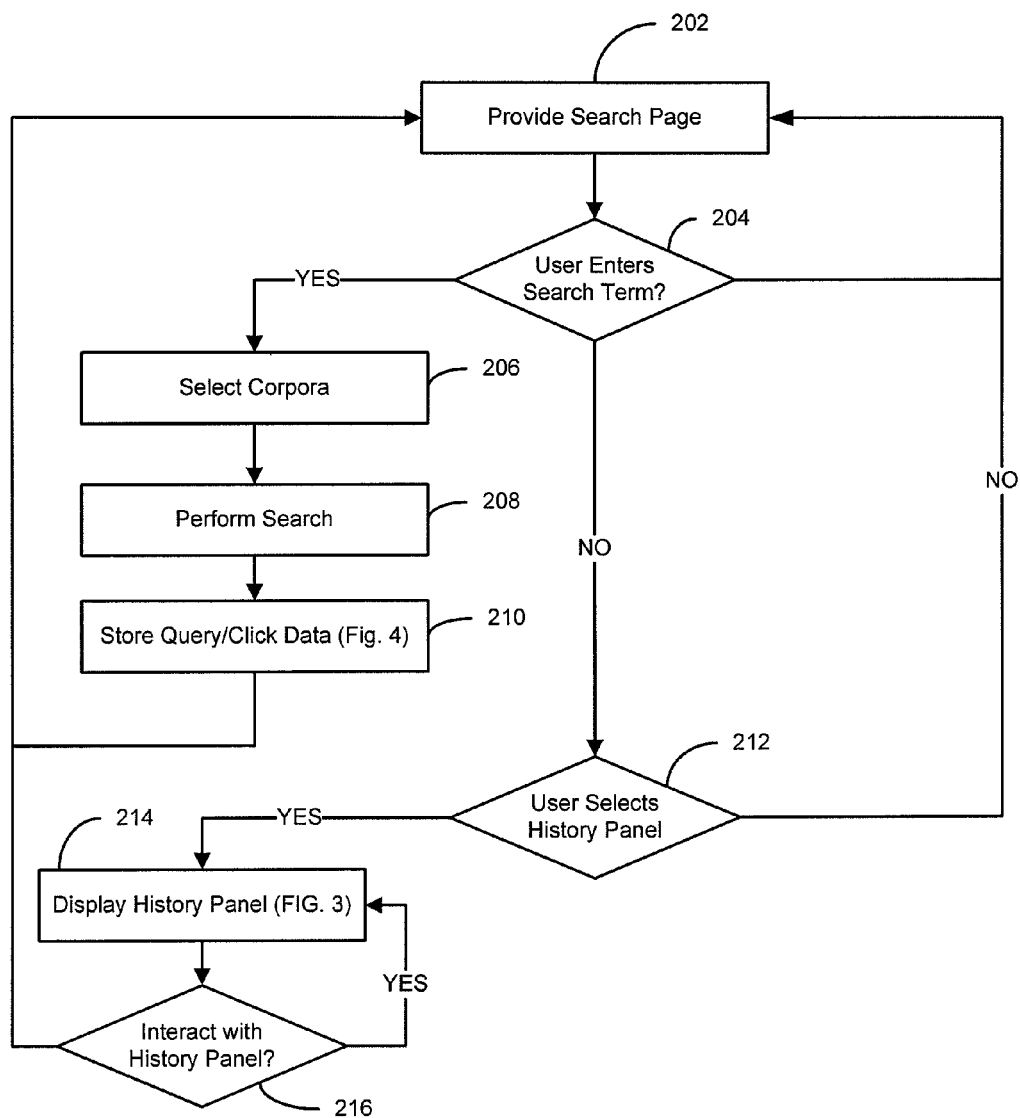
FIG. 2 presents a flow diagram illustrating a method for providing history content within a search result page according to one embodiment of the present invention.

FIG. 2 presents a flow diagram depicting a method for providing history content within a search result page. As illustrated, a user may be provided with a search page, step 202. In one embodiment, a search page may comprise an HTML file including client side executable code, such as JavaScript. A search page may be retrieved in response to a search query or in response to a request for a search page. For example, a search page may be requested initially via an HTTP request for the URL "search.yahoo.com". Subsequently, searches run from the initial search page may result in a loading of subsequent search pages. According to another embodiment, a search box component, history component and various other components may be constantly present on the search page. That is, the aforementioned components may remain constantly on the search results page as new search results are fetched and presented on the search page. For example, a search box and history component may be present within one frame of a search page and search results may be loaded into a second frame present on the same search page.

After a search page is presented the user, the search page waits until user interaction has occurred. A first interaction that may occur is the entering of a search term, step 204. When a user enters a search term within the search page, a corpora must first be selected, step 206. In some embodiments, a corpora may be selected by the user prior to the execution of a user search. For example, a plurality of corporas may include a "Web", "News", "Images", "Video" or "History" corpora. Web, News, Image and Video corporas may allow a user search to be executed on web, news, image and video databases respectively. A history corpus may allow a user to perform searches on a record of user search history and activity as is described below in greater detail. Furthermore, a default corpora may be selected without user interaction. For example, the default corpora may be a "Web" corpora so that the default user search may be run on a database of web pages.

Once a corpora is selected, a search is performed, step 208. After a search is performed, search results may be provided to the search page. In addition, history data may be stored relating to the user search query, step 210. The step of recording history data is described more fully with respect to FIG. 4. After history data is recorded and the search results are loaded, the search page is displayed in full again, step 202.

Alternatively, if a user does not enter a search term, the user may interact with a provided history panel, step 212. In accordance with one embodiment, a history panel may initially be hidden from a user until selected. For example, a component on the search page may contain a component initiating the display of a history component, such as a button element. Upon detecting the interaction indicating the display of the history panel, said panel is displayed on the search page, step 214, and waits for interaction from a user, step 216. The process of interacting with the history is described more fully with respect to FIG. 3.

Figure 3:
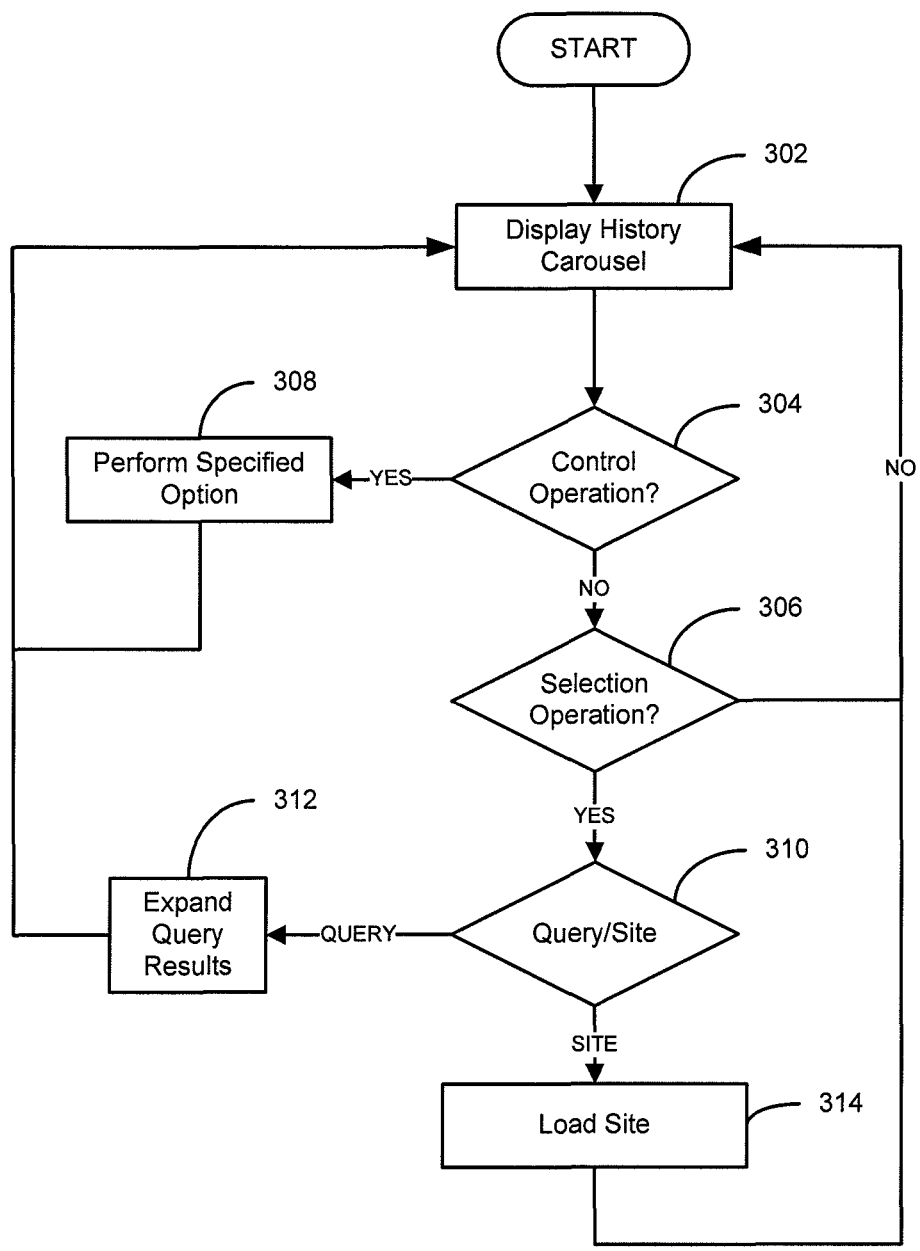
FIG. 3 presents a flow diagram illustrating a method for displaying history content within a search results page according to one embodiment of the present invention.

FIG. 3 presents a flow diagram illustrating a method for displaying history content within a search results page. As illustrated, a history carousel is displayed, step 302. A history carousel may comprise an HTML and JavaScript element that allows a graphical record of history elements to be displayed. In accordance with one embodiment, history elements may comprise query elements and clicked result links. For example, a user may enter a query "soccer tickets" and may select a returned link associated with the URL "http://www-.footballtickets.com". The history panel may be operative to store both the query and selected result, as is described with respect to FIG. 4.

After the history carousel is displayed, a user may perform at least two actions: a control operation, step 304 or a selection operation, step 306. A control operation comprises at least one action that modifies the display of history elements within the carousel. Exemplary actions include deleting history items, ordering history items, hiding history items and various other configuration options related to the history items.

If a user performs any of the above actions, the selected operation is performed, step 308. For example, if a user selects the delete operation, a history item may be deleted from the carousel. After the action completes, the history console is displayed as previously displayed, step 302.

In addition to control operations, a selection operation may be requested by the user, step 306. In some embodiments, a selection operation may comprise the selection of a query results page or a specific query result. A history carousel may comprise a plurality of textual or graphical representations of a users search history. For example, a history carousel may comprise a first set of icons corresponding to a user's search queries and a second set of icons corresponding to clicked search results. A user may click on one of the first set of icons to return to a previously entered query. Additionally, a user may click on one of the second set of icons to return to a previously viewed search result.

If a user selects a previously entered query (310), the query results are expanded, step 312. In an alternative embodiment, query icons may be replaced by "concept" items. For example, a plurality of queries such as "new york city hotels", "new york city" and "new york city subway" may be grouped as an item "new york city". In this embodiment, a category stores both queries and links selected in response to said queries. In this embodiment, the expansion (312) may include queries and clicked search results. Alternatively, a user may select a specific site to return to, step 310. In this scenario, the site may simply be loaded into a content frame, step 314 and the history carousel may remain displayed, step 302.

Figure 4:
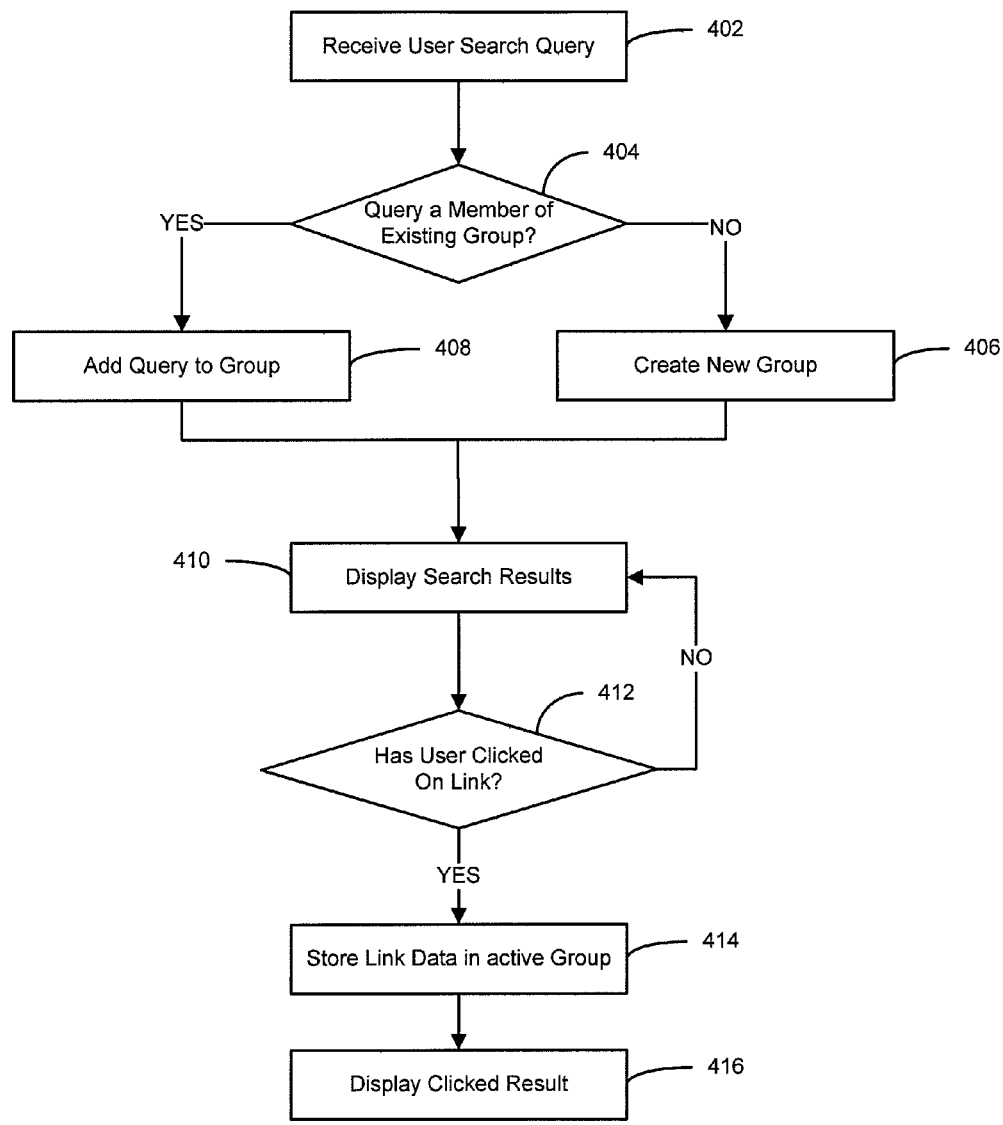
FIG. 4 presents a flow diagram illustrating a method for storing history content within a search results page according to one embodiment of the present invention.

FIG. 4 presents a flow diagram illustrating a method for storing history content within a search results page. Grouping or clustering user history provides users with a powerful organizational tool, as having the ability to cluster a search history for a given user as a task or area of research (e.g., time or subject matter based) is more intuitive than a linear organization for a search history.

As illustrated, a search query is received by a search page, step 402. A user search query may be intercepted via a JavaScript function prior to submitting the search request to a search engine. For example, an "onclick" event handler may be tied to an HTML FORM button allowing a JavaScript function to extract the requested query prior to submitting the query to the search engine.

Upon intercepting the user search query, a determination is made to determine if the search query is a member of an existing group, step 404. In a simplistic embodiment, a group may be defined as a search query, thus a check may fail and a new group may be created for a given query. In more sophisticated embodiments queries may be grouped according to subject matter, according to query term similarity, etc. That is, a plurality of related search queries may be grouped as a logical container. For example, the searches "new york city", "nyc subway" and "empire state building" may be grouped as a single category "new york city". Rules defining the grouping of search queries may be modified by a system administrator, site developer or any person responsible for site maintenance. Alternatively, an adaptable algorithm may be employed to passively examine global search trends and formulate rules based upon global search history.

If it is determined that a query is not a member of an existing category, a new group is created and the user query is stored within the group, step 406. If it is determined that a query may appropriately be placed within an existing group, the query is simply placed within the existing group, step 408. Groups and history data maybe stored in a lightweight record stored on a user device, such as in a cookie. Alternatively embodiments may exist wherein user history may be stored in a location other than the user device, such as on an external server. According to this alternative embodiment, a cookie may comprise information sufficient to locate history data for the user on a scalable database, or a user may provide credentials for validation to access history data at the scalable database.

After the query data has been processed and stored (406-408) a request is made for a plurality of search results corresponding to the user query and the returned search results are displayed on the search page, step 410. A search page displays the returned search results until a search result is selected by the user, step 412.

When a user selects a link, link data is first extracted and stored in the history data, step 414. In a one embodiment this is accomplished via a JavaScript function call. For example, an HTML hyperlink may call a JavaScript function which processing the link information prior to retrieving the associated link. When a user selects a specific link a function is executed that stores at least the link address, the link title and the time the link was clicked by the user. This information is then recorded in the session history data as described previously and the requested page is displayed, step 416.

Figure 5:
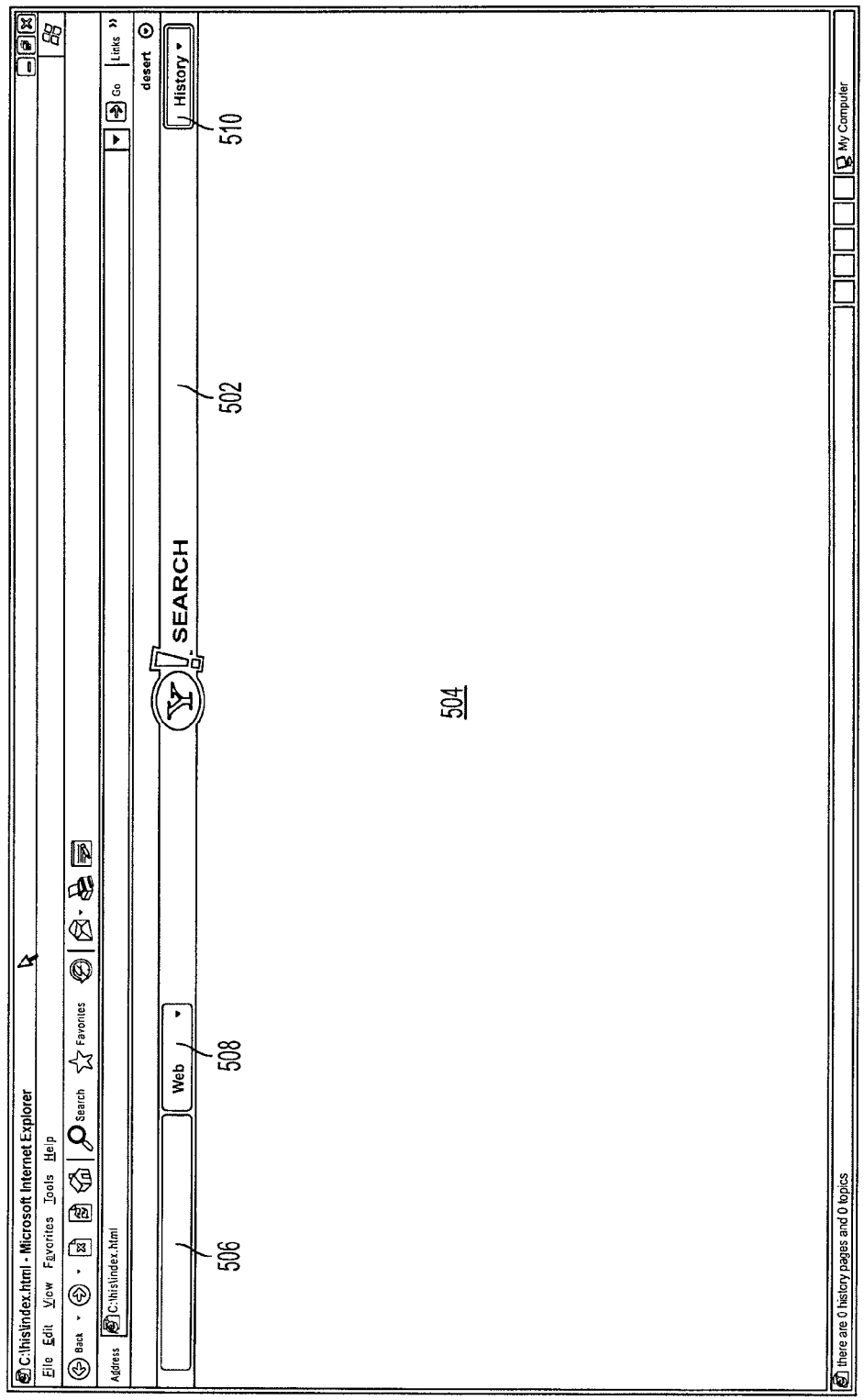
FIGS. 5 through 9 present screen diagrams illustrating one embodiment of a history component within a search results page according embodiments of the present invention.

FIG. 5 presents a screen diagram illustrating one embodiment of a search page. FIG. 5 illustrates the start page of a search page. A start page may be loaded by a user via entering the URL of a search page or via the selection of a hyperlink linked to the search page.

As illustrated, a search page comprises a search component 502 and a search results component 504. Components 502 and 504 may be implemented via HTML frames. In an alternative embodiment, search components 502 and 504 may be implemented via HTML DIV elements or HTML IFRAME elements. Search results component 504 comprises a component operative to display a list of search results in response to a user query. Although illustrated as an empty component, search results component 504 may initially comprise a plurality of other components, such as a directory listing component, a news component or any other portlet known in the art.

Search component 502 may comprise at least a search box 506, a search selector 508 and a history control 508. Search box 506 may comprise an HTML INPUT element operative to receive a textual input corresponding to a search query. Search box 506 is communicatively coupled with search selector 508, an HTML element operative to select a search corpora. Search selector 508 may comprise an HTML input element, image or other HTML element know in the art to submit form data. A user may click on the text within a search selector 508 ("Web" in FIG. 5) to submit the query entered in search box 506. Alternatively, a user may click an expansion button (represented as a down arrow in FIG. 5) located on the search selector 506 to select a different corpora to search.

Search component 502 may further comprise a history control 508. History control 508 may be structurally similar to search selector 506, but controls the operation of the history carousel, which is described in greater detail herein. A history control 508 may have two clickable controls, a textual control ("History" in FIG. 5) and a drop-down control (a down arrow in FIG. 5). Upon clicking the textual control, a history carousel may be displayed below the search component 502. History control 508 may also contain a drop down control that allows for the selection of options. The options available for a history panel are described more fully with respect to FIG. 8.

Figure 6:
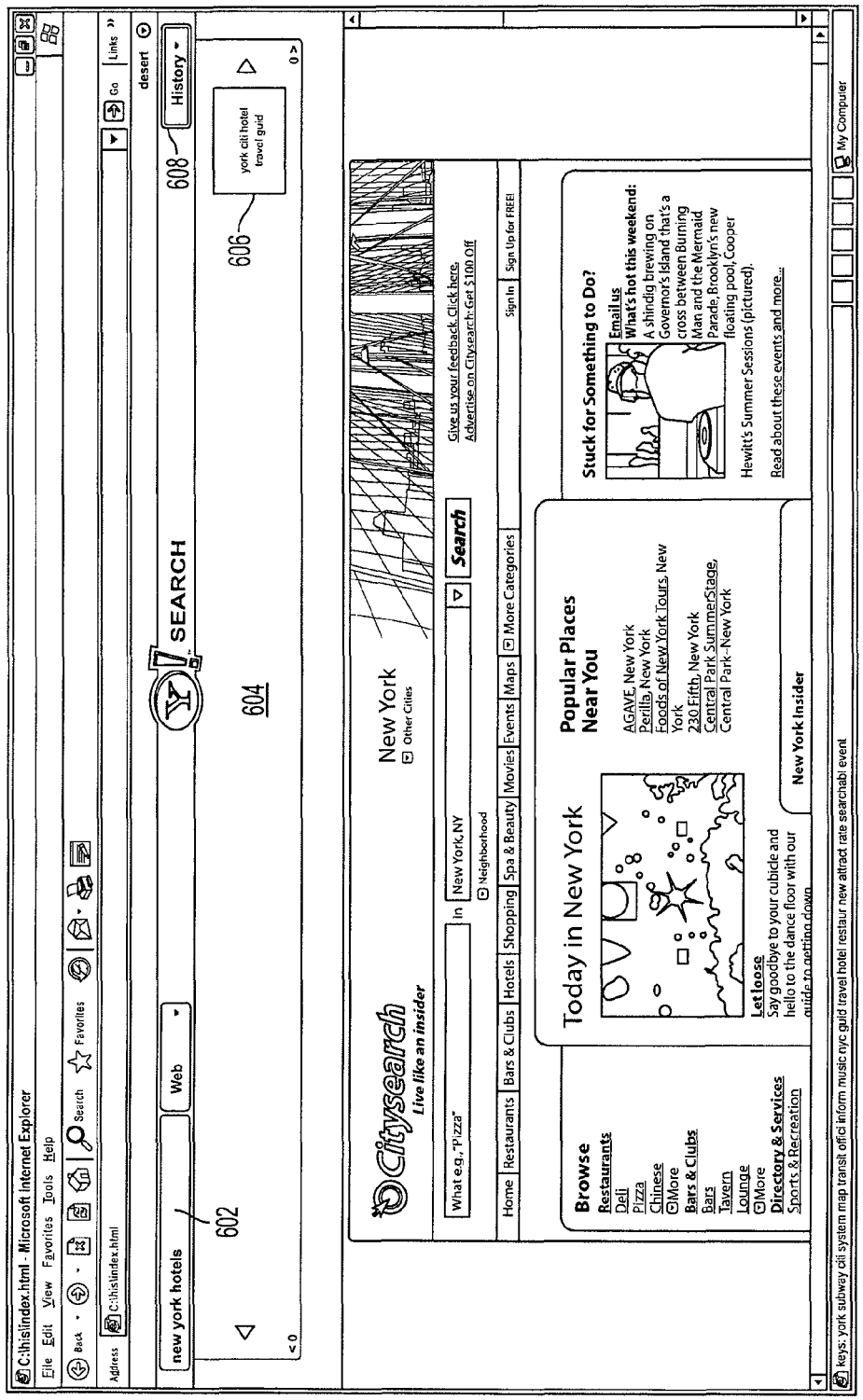

FIG. 6 presents a screen diagram illustrating a history carousel after a plurality of searches. FIG. 6 illustrates an embodiment of a search page containing a history carousel 604 (which may be a graphical interface to the history module described above) after the searches "new york city", "new york city subway" and "new york city hotels" have been entered by a user. FIG. 6 further illustrates the selection of a first search result in response to the query "new york city hotels".

As history carousel 604 is displayed in response to a user selecting the textual element of history control 608. As illustrated, history carousel 604 comprises at least one history content item 606. Although only one item 606 is illustrated, a plurality of content items may exist within history carousel 604 as a user interacts with the search engine.

In accordance with one embodiment, history content item 606 consists of a plurality of keywords extracted from a user's search query and/or results and utilized to group both searches and clicked links. As illustrated in FIG. 6, the terms "york", "city", "hotel", "travel" and "guide" are utilized to group the previous three searches as well as the selected search result from the "new york city hotels" query.

Figure 7:
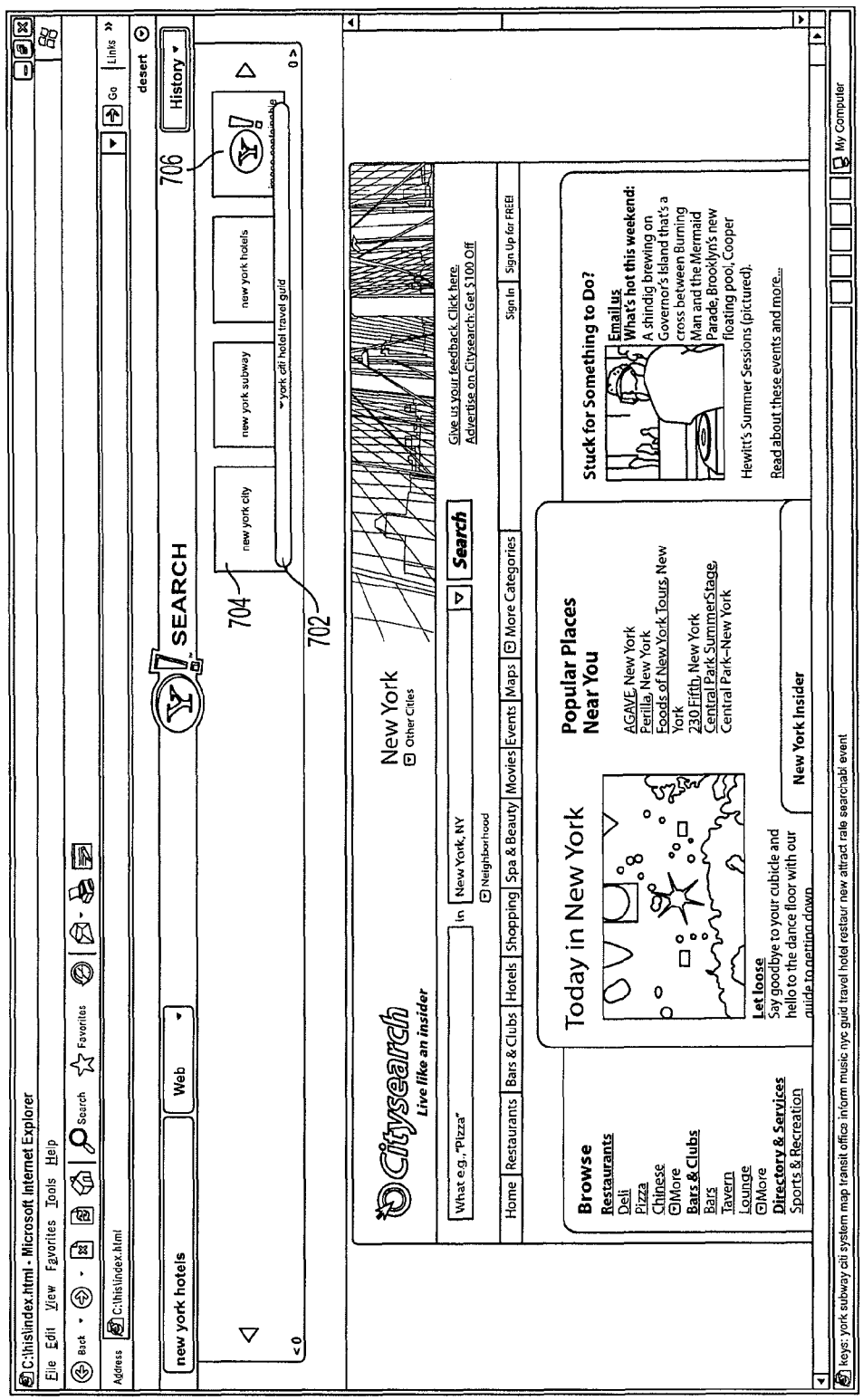

FIG. 7 presents a screen diagram illustrating the results of expanding a history content item. FIG. 7 illustrates one embodiment of the results of expanding a history content item, such as history item 606 shown in FIG. 6. As illustrated, an expanded history item 702 may comprise a plurality of search query links 704 and a plurality of clicked search results 706.

A given history item 704 and 706 may be responsive to user interaction. For example, a given content element 704, 706, may allow user to delete elements, re-group elements or sort elements. Various other operations are discussed further with respect to FIG. 8.

Figure 8:
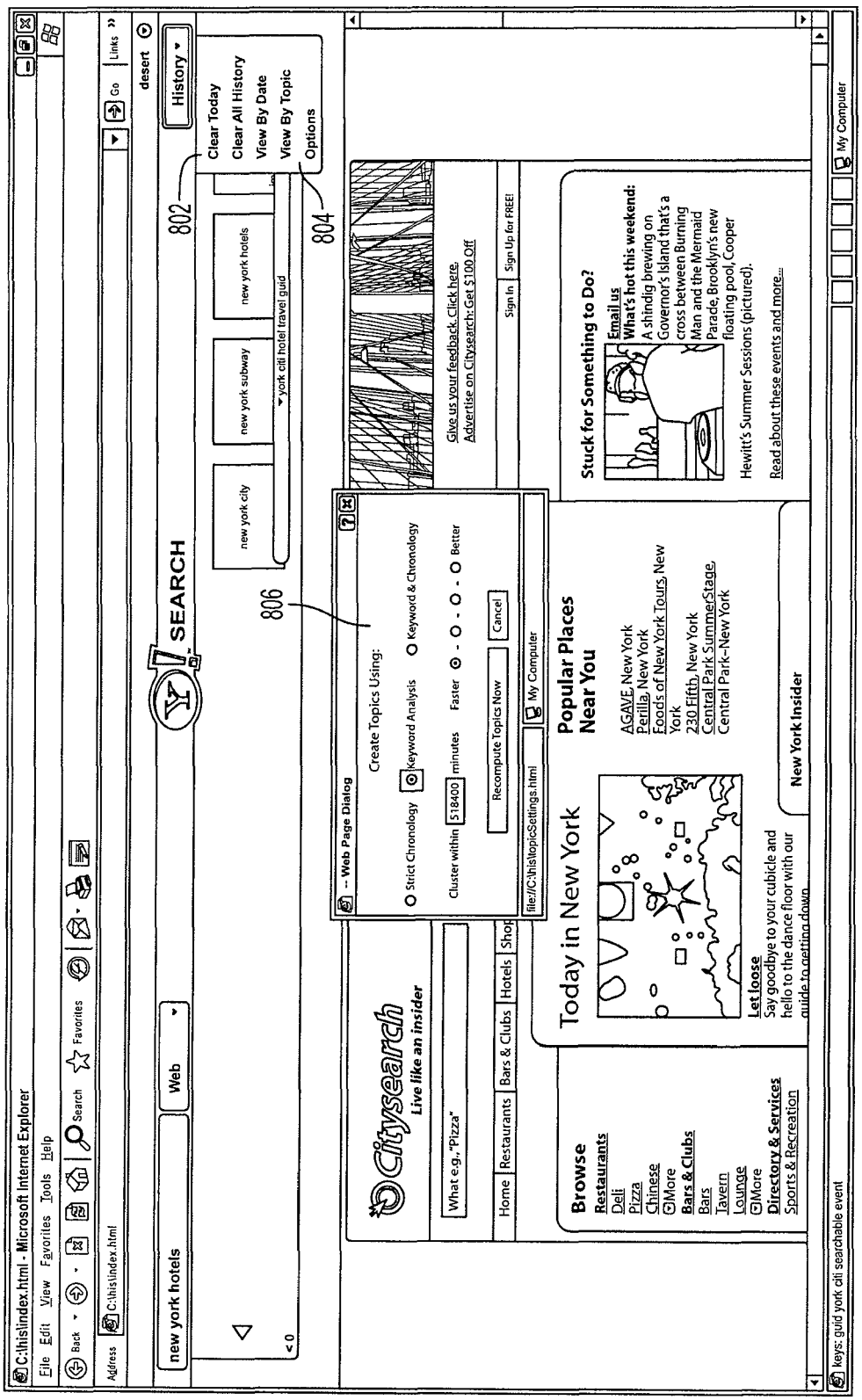

FIG. 8 presents a screen diagram illustrating the display of a history carousel options panel 802. As illustrated, history carousel options panel 802 may displayed in response to interacting with the drop down control present on a history control element.

History carousel options panel 802 may comprise a plurality of options including, but not limited to, clearing daily history, clearing all history, sorting history by date, sorting history by topic and an advanced options option. Clearing daily history and all history may remove history items from the current day or all history elements, respectively. Sorting history by date or by topic may arrange the history content items in the carousel by the date viewed, or by the topic, respectively.

History carousel options panel 802 further comprises an advanced options tab 804. In accordance with one embodiment, advanced options tab 804 allows a user to configure the operation of the history carousel. In response to selecting the advanced options tab 804, a configuration panel 806 may be presented to the user. A configuration panel 806 may comprise a plurality of configuration settings including a history creation setting and a clustering setting. As illustrated, a history creation setting may control how history items are generated. History items may be generated based strictly on the order that they are received by the search page. In this embodiment, the content of the search queries and clicked search results is ignored and only the chronology of the queries and clicked results is used to formulate a user history. Alternatively, a user may select that the queries and clicked results be analyzed by keyword, that is, the content of the queries and clicked results are utilized to group history items into relevant groups. A third alternative combines both keyword analysis and the chronology of the queries and clicked results to generate a history of queries and clicked results.

Figure 9:
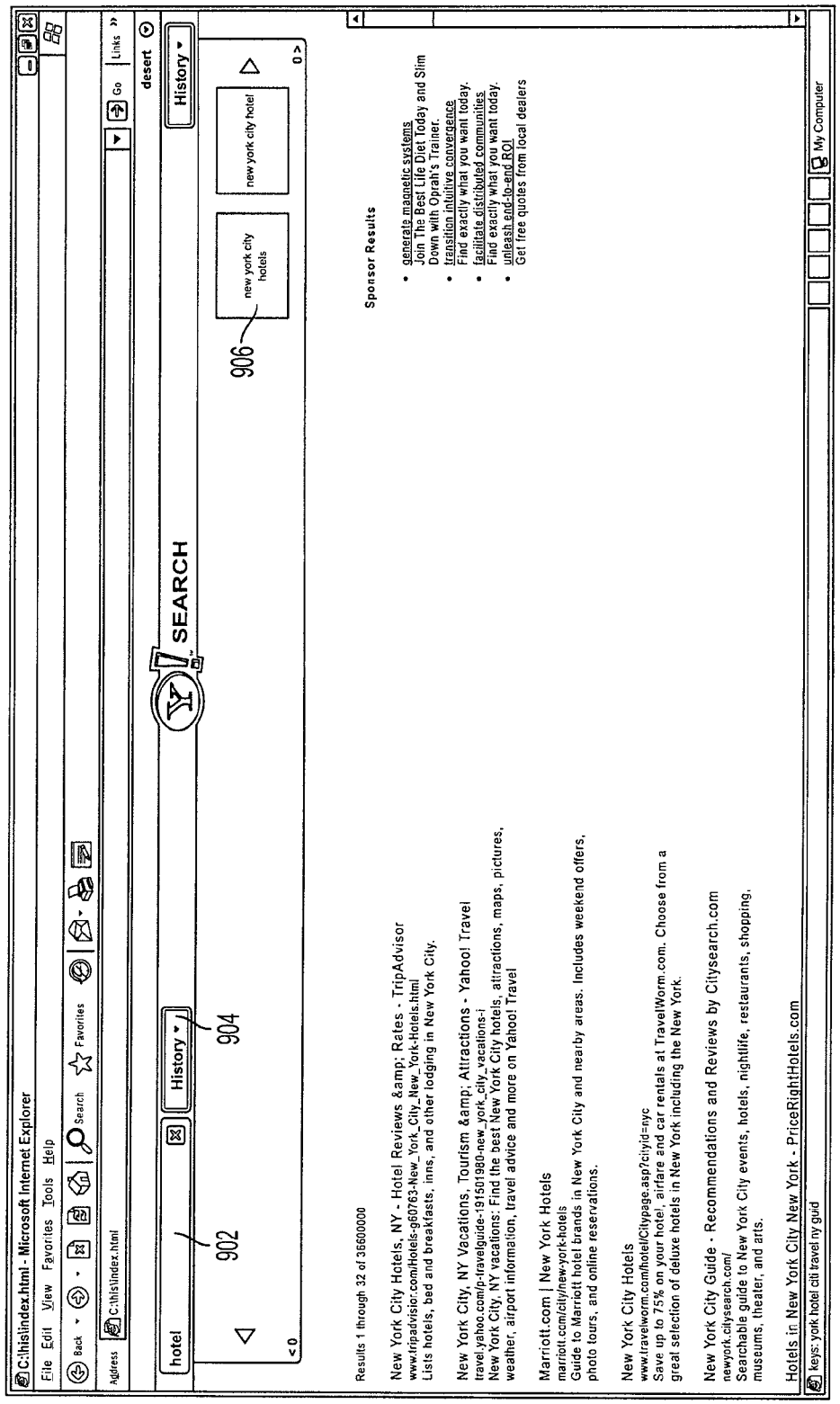

FIG. 9 presents a screen diagram illustrating searching history data stored on a search page. As illustrated in FIG. 9, a user may select the history corpora via search selector 904 and enter a search query in search box 902. The search page may then perform a search of the lightweight history record to present the matching results. A history record may be stored locally in a lightweight record, such as within a client side cookie. In this embodiment, a JavaScript function may parse the lightweight record and provide the relevant history item 906, providing fast access to the lightweight data.

FIGS. 1 through 9 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for controlling a user history module, the method comprising:
    providing a history carousel module to a user, the history carousel module intercepting user interactions with a content module, the content module being a search engine interface, the history carousel module:
    monitoring the user interactions with respect to one or more content items, the one or more content items responsive to a plurality of queries within the content module;
    associating the user interactions with a given corpus of a plurality of corpora selected for searching with the plurality of queries, wherein the plurality of corpora are of various content types upon which searches are performed;
    generating history information related to the user interactions with the one or more content items and the given corpus of the plurality of corpora selected for the searches associated with the plurality of queries;
    extracting one or more keywords from each of the plurality of queries and the one or more content items, wherein the plurality of queries and the one or more content items are associated with a given concept;
    generating a history concept cluster on the basis of the extracted keywords, the history concept cluster including a plurality of logically related queries;
    clustering the history information with the plurality of queries and the one or more content items interacted with by the user into the history concept cluster; and
    updating the history carousel module with an icon representing the history concept cluster wherein the icon is capable of providing textual display of the extracted keywords, being selectable during content navigation, and expanded to reveal the plurality of queries and the one or more content items in the history concept cluster.

2. The method of claim 1, wherein the updating the history carousel module includes clearing the history carousel module.

3. The method of claim 1, wherein the updating the history carousel module includes bookmarking, sharing or marking search queries or selected search results in the history carousel module.

4. The method of claim 1, wherein monitoring the user interactions includes monitoring input of text via an input device.

5. The method of claim 4, wherein performing the updating the history carousel module includes filtering search queries and search results on the basis of the input received from the input device.

6. The method of claim 5, wherein filtering comprises limiting search queries and search results that the history carousel module displays.

7. A system for controlling a user search history module, the system comprising:
    a content server communicatively coupled a plurality of client devices via network, the content server operative to receive search queries to the content server and to provide a plurality of search results to the client devices, the content server further operative to:
    provide a history carousel module to a user, the history carousel module intercepting user interactions with a content module, the content module being a search engine, the history carousel module:
    monitor the user interactions with respect to one or more content items responsive to a plurality of queries within the content module,
    associate the user interactions with a given corpus of a plurality of corpora selected for searching with the plurality of queries, wherein the plurality of corpora are of various content types upon which searches are performed,
    generate history information related to the user interactions with the one or more content items and the given corpus of the plurality of corpora selected for the searches associated with the plurality of queries,
    extract one or more keywords from each of the plurality of queries and the one or more content items, wherein the plurality of queries and the one or more content items are associated with a given concept;
    generate a history concept cluster on the basis of the extracted keywords, the history concept cluster including a plurality of logically related queries;
    cluster the history information with the plurality of queries and the one or more content items interacted with by the user into the history concept clusters, and
    update the history carousel module with an icon representing the history concept cluster wherein the icon is capable of providing textual display of the extracted keywords, being selectable during content navigation, and expanded to reveal the plurality of queries and the one or more content items in the history concept cluster.

8. The system of claim 7, wherein the updating the history carousel module includes clearing said history carousel module.

9. The system of claim 7, wherein the updating the history carousel module includes bookmarking, sharing or marking search queries or selected search results.

10. The system of claim 7, wherein the user interaction includes input of text via an input device.

11. The system of claim 10, wherein the updating the history carousel module includes filtering the search queries and the search results on the basis of the input received by the input device.

12. The system of claim 11, wherein the input device comprises a keyboard.

13. Non-transitory computer readable media comprising program code for execution by a programmable processor that instructs the processor to perform a method for controlling a user search history module, the computer readable media comprising:

program code for providing a history carousel module to a user, the history carousel module intercepting user interactions with a content module, the content module being a search engine interface, the history carousel module comprising:

program code for monitoring the user interactions with respect to one or more content items responsive to a plurality of queries within the content module;

program code for associating the user interactions with a given corpus of a plurality of corpora selected for searching with the plurality of queries, wherein the plurality of corpora are of various content types upon which searches are performed;

program code for generating history information related to the user interactions with the one or more content items and the given corpus of the plurality of corpora selected for the searches associated with the plurality of queries;

program code for extracting one or more keywords from each of the plurality of queries and the one or more content items, wherein the plurality of queries and the one or more content items are associated with a given concept;

program code for generating a history concept cluster on the basis of the extracted keywords, the history concept cluster including a plurality of logically related queries;

program code for clustering the history information with the plurality of queries and the one or more content items interacted with by the user into the history concept clusters; and program code for updating the history carousel module with an icon representing the history concept cluster wherein the icon is capable of providing textual display of the extracted keywords, being selectable during content navigation, and expanded to reveal the plurality of queries and the one or more content items in the history concept cluster.

14. The computer readable media of claim 13, wherein the program code for updating the history carousel module includes program code for clearing the history carousel module.

15. The computer readable media of claim 13, wherein the program code for updating the history carousel module includes program code for bookmarking, sharing or marking search queries or selected search results.

16. The computer readable media of claim 13, wherein the program code for monitoring the user interactions comprises program code for monitoring input of text via an input device.

17. The computer readable media of claim 16, wherein the program code for updating the history carousel module includes program code for filtering search queries and search results on the basis of the input received from the input device.

18. The computer readable media of claim 17, wherein the program code for filtering comprises program code for limiting search queries and search results that the history carousel module displays.

\* \* \* \* \*